United States Patent
Boivin et al.

(10) Patent No.: US 8,923,373 B2
(45) Date of Patent: *Dec. 30, 2014

(54) POWERLINE CONTROL INTERFACE IN PHOTOVOLTAIC ENVIRONMENT FOR FREQUENCY AND AMPLITUDE MODULATION TRANSMITTER

(76) Inventors: Didier Boivin, Santa Clara, CA (US); Michel Gaeta, La valette du var (FR)

( * ) Notice: Subject to any disclaimer, the term of this patent is extended or adjusted under 35 U.S.C. 154(b) by 64 days.

This patent is subject to a terminal disclaimer.

(21) Appl. No.: 13/492,798

(22) Filed: Jun. 8, 2012

(65) Prior Publication Data

US 2012/0314747 A1    Dec. 13, 2012

Related U.S. Application Data

(63) Continuation-in-part of application No. 13/227,891, filed on Sep. 8, 2011.

(60) Provisional application No. 61/495,924, filed on Jun. 10, 2011.

(51) Int. Cl.
*H04B 17/00* (2006.01)
*H04L 25/49* (2006.01)
*H04B 3/54* (2006.01)

(52) U.S. Cl.
CPC ............ *H04L 25/4902* (2013.01); *H04B 3/548* (2013.01); *H04B 2203/5458* (2013.01); *H04B 2203/547* (2013.01)
USPC ........................................................ 375/224

(58) Field of Classification Search
CPC ............... H04L 1/20; H04L 1/24; H04B 3/46
USPC ................... 375/224, 238, 257, 295, 312, 314
See application file for complete search history.

(56) References Cited

U.S. PATENT DOCUMENTS

| | | | |
|---|---|---|---|
| 6,459,363 B1 * | 10/2002 | Walker et al. | ................. 375/238 |
| 6,686,832 B2 | 2/2004 | Abraham | |
| 6,922,135 B2 | 7/2005 | Abraham | |
| 2004/0246108 A1 | 12/2004 | Robertson et al. | |
| 2006/0050810 A1 * | 3/2006 | Haque et al. | ................. 375/297 |

FOREIGN PATENT DOCUMENTS

| | | |
|---|---|---|
| AU | 6462298 A | 9/1998 |
| CA | 2153140 A1 | 1/1996 |
| CA | 2491604 | 1/1996 |
| CA | 2249164 A1 | 4/1999 |
| EP | 1197011 | 4/2002 |
| WO | WO 03/065597 | 8/2003 |
| WO | WO 2006/113945 | 10/2006 |
| WO | WO 2009/125080 | 10/2009 |

* cited by examiner

*Primary Examiner* — Khai Tran
(74) *Attorney, Agent, or Firm* — Alexander Chen, Esq.

(57) ABSTRACT

An apparatus is disclosed where a Maximum power point tracking (MPPT) circuit is used to transmit data into the photovoltaic network, where the PLC communication is pulling the required transmit energy from the photovoltaic network, where the transmit chain is using the MPPT transistor of the photovoltaic DC Optimizer, where the transmit chain is transmitting data using Standard modulation such as ASK, FSK, S-FSK, BPSK, OFDM, etc. . . . where the transmitted data are passed on to the powerline network by the use of an "Input signal" adaptation stage, where signals summation is performed to create a command signal used to control the transmission of data by providing enough voltage to polarize the Transistor (i.e: MOS FET) used in the powerline path.

16 Claims, 4 Drawing Sheets

POWERLINE CONTROL INTERFACE IN PHOTOVOLTAIC ENVIRONMENT FOR FREQUENCY AND AMPLITUDE MODULATION TRANSMITTER

CROSS REFERENCE TO RELATED APPLICATION

This application is a continuation in part of a U.S. patent application Ser. No. 13/227,891 entitled "Powerline Control Interface for Frequency and Amplitude Modulation Transmitter" which was filled on Sep. 8, 2011 in the US Patent & Trademark Office which claims the priority to the filing date of U.S. provisional patent application No. 61/495,924 entitled "New innovative Powerline Communication (PLC) solutions" which was filed Jun. 10, 2011. Both are incorporated by reference herein.

FIELD OF THE INVENTION

The present invention relates to a type of Powerline Communication, in any frequency band plans (from few hundred KHz to few MHz), embedded within a Maximum Power Point Tracking (MPPT) of a Photovoltaic micro-convertor (DC/DC) system. By using the electronics of the MPPT, the invention creates a zero-energy, zero-cost PV power line coupler (PV Coupler), resulting in an ultra low power, low cost for the overall PHY standard modulation.

BACKGROUND OF THE INVENTION

The focus of our invention is on powerline communication within individual DC/DC micro-converters (also called DC Optimizer) use to convert the unregulated generated DC power from the PV into a fixed DC output voltage. This output voltage is fed into to a centralized DC/AC inverter using the power wires of the various photovoltaic strings (DC bus). One-way of making sure DC Optimizers are efficient is by adding some communication capabilities, like PLC, between the multiple DC Optimizers on the different string of the PV installation. Unfortunately, most of the communication system used today in the DC Optimizers are: a) an add-on communication system to the existing DC/DC converter making the overall solution not cost efficient; b) an energy inefficient communication solution reducing the performances of the overall PV installation. Advantages of having communication capabilities in a photovoltaic system are security, safety, remote management, etc. . . .

As a continuation of the U.S. pending patent application Ser. No. 13/227,891 entitled "Powerline Control Interface for Frequency and Amplitude Modulation Transmitter", the focus of our invention remains at the Physical Layer in PowerLine Communications (PLC) environment.

Consequently the present invention was conceived to take advantage of the existing electronics of the MPPT function within a DC Optimizer to: a) improving the performances over a traditional Powerline Interface to transmit data on the power line by using ("pulling") the required current from the DC Bus and therefore reducing the overall power consumption of the transmit system to only few milli-watts required by the electronics of the PV Coupler; b) eliminating the cost of the Powerline interface and therefore reducing the overall BOM of the system.

Furthermore, the use of the present invention is independent of the type of PHY modulation (ASK, FSK, S-FSK, BPSK, OFDM, etc. . . . ) and with proper adaptation of some of the electronics; the invention can be used in any frequency band. Only limitation of the created system will be to have a different communication frequency band from the Pulse Width Modulation (PWM) frequency use by the MPPT electronics. Frequency bands relevant to the smart grid market can be used, such as:
 CENELEC, ARIB and FCC bands (<500 KHz),
 SAE bands,
 Broadband Powerline communications frequency bands

OBJECT OF THE INVENTION

The reason of the invention is to provide an ultra low power, low cost and small form factor PV Coupler as part of a PLC Communication system which sits between a standard PHY modulation and the DC Bus wires. The use of this new PLC communication feature is to connect all Photovoltaic Optimizer devices within their eco-system (a Photovoltaic Distributed DC Optimizer System). By embedding the invention within the MPPT circuit of the Photovoltaic Optimizer, it will result in: a) improving the performances over a traditional Powerline Interface; b) reducing the overall power consumption of the DC optimizer, as no need for line coupler; c) providing a "no-cost" PV Coupler, therefore reducing significantly the overall BOM of the overall communication circuit within a complete photovoltaic system by eliminating expensive and bulky components, like transformer and line driver, used by traditional PLC system.

An additional object of the present invention provides improvements in term of system power consumption by generating a Transmit signal ("Pulling"), in any frequency band Plan, from the power line (DC bus) versus existing PLC technology that drive transmit power ("Pushing") into the power lines (DC bus) using inductive or capacitive coupling to the power wires.

Another object of the invention is to be able to use any existing modulation as part of the overall PHY modulation stage of the system. Standard modulations such as ASK, FSK, S-FSK, BPSK, OFDM, etc. . . . within a defined frequency bandwidth can be transmitted through the use of the invention.

Further object of the present invention is to use a "Summation" circuit to add the transmission of data, using the Input signal, and the PWM signal to create the command of the Transistor (i.e: MOS FET) used by the MPPT circuit of the DC Optimizer Further object of the invention is to leverage existing Receiver processing circuit (DSP) to receive data signals, which are compatible with the existing systems when using the same modulation and frequency bands. Therefore, the invention allows for some compatibility with systems already deployed in the field.

One can also use this invention in any DC environment other than PV optimizers, Home Automation (i.e: HVAC control system), AC/DC or DC/DC Power supply markets (i.e: it can be used in the context of "smart" power supply allowing a Grid operator to have a direct impact on the use or not of equipment in its network).

SUMMARY OF THE INVENTION

Embodiments of the present invention is to create a method to generate a continuous Standard Transmit signal ("Pulling") from the power of the DC Bus of a photovoltaic system as it connects between two wires of the DC bus network through a Transistor (i.e: MOS FET) used by the electronics of a DC Optimizer device.

Further embodiment of the present invention is to have a single power rail on the board as the transmit stage is pulling power from the DC Bus through the use of a Transistor (i.e: MOS FET) and an adapted Filtering circuit and therefore eliminating the need for other Transmit power supply rail (i.e: no need for a 12 Voltage rail).

Further embodiment is to generate a Command signal for the Transistor (i.e: MOS FET) that will create the Standard Transmit signal from the DC Bus combines with the PWM signal of the MPPT circuit. The Command signal is generated during the transmission by summing the PWM command signal and the Input signal for the PLC communication. Some electronics are used to produce the Command signal voltages allowing a Linear Amplifier to command the Transistor (i.e: MOS FET) by creating the minimum power consumption for polarization of Transistor (i.e: MOS FET).

Another embodiment of the present invention is to use a chain of Linear Amplifier circuits to first sum up the Standard Modulation signal (Input signal) to a PWM Command signal and then create an in-phase signal that will use to command the stage driving the Transistor (i.e: MOS FET) and in order to generate Standard Transmit signal ("Pulling") from the DC Bus.

It is desirable that the amplitude of the direct voltage (DC) of the DC Bus network is greater than the threshold of the Transistor (i.e: MOS FET) to be polarized. This Current modulation is independent of the network impedance as long as it stays higher than the required voltage for the polarization of the Transistor (i.e: MOS FET) and inductance/resistor voltage.

Embodiment of the present invention is to be able to generate some modulation signals leveraging Standard Modulation (such as ASK, FSK, S-FSK, BPSK, OFDM, etc. . . . ) as they are used in many photovoltaic systems.

Further embodiment of the invention includes a processing circuit to receive data signals, which are compatible with system using same Standard Modulation (same modulation and frequency bands) than the present invention. Therefore, the invention allows to keeping some compatibility (interoperability) with systems already deployed in the field.

Embodiments of the present invention are directed to better control of the amplitude of the modulated signal, in particular with regard to electromagnetic compatibility rules of Electromagnetic Interference/Electromagnetic Compatibility (EMI/EMC).

BRIEFS DESCRIPTIONS OF THE DRAWINGS

The present invention will be better understood and fully appreciated when read in conjunction with the appended drawings. It should be understood, however, that the present invention is not limited to the precise arrangements and instrumentations as shown in the drawings.

DETAILED DESCRIPTIONS OF THE EMBODIMENTS

Figure 1:
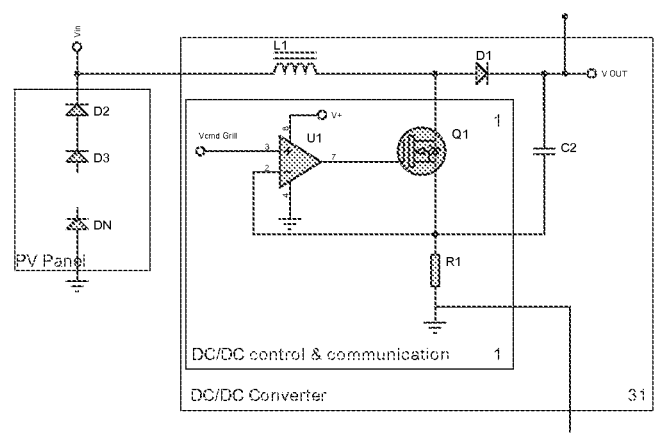
FIG. 1 shows a conventional micro-convertor block diagram, emphasizing the possible addition of communication without using any Powerline Communication coupler.

FIG. 1 shows a complete micro-convertor system 31 for a photovoltaic environment embedding some PLC technology and more particularly the last stage of adaptation 1 to enable the DC Optimizer system 31 to also be used as a PLC interface, "Pulling" the transmit energy from the DC Bus. As a result, by leveraging the present invention, systems, like PV Optimizers, are a) most cost effective solution due to its reduced number of components as a result of the elimination of all components found in a traditional PLC system; b) ultra low power energy communication solution due to the absence of powerline drivers in the communication interface; c) improving the performances of the overall system due to need of less power supply for the overall system.

U.S. Pat. No. 7,078,982 provides a method wherein such high frequency oscillations are used to carry data through an electric network. The high-frequency oscillations are generated by the line coupler, comprising an electric element in series with a switch, the whole being connected between two wires of the electric network. A control signal carrying data is applied to the switch and alternately allows the switch to be closed and opened. Thus, the rhythm of the apparition of the high-frequency oscillations is controlled.

Figure 2:
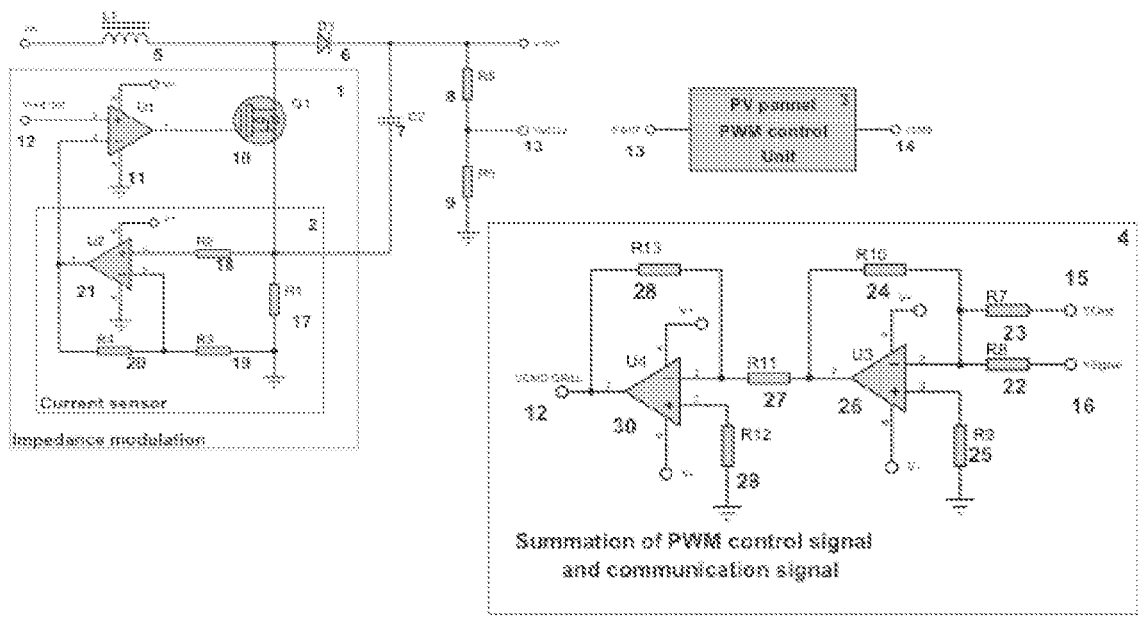
FIG. 2 shows an electrical circuit diagram of the PV Coupler reflecting the embodiments bring by the invention when use in a DC power distribution environment.

FIG. 2 shows a micro-convertor system, more specifically the Boost circuitry 1 leveraging the present invention to create PLC communication system. In this new system, block 2 is a current sensor circuit to regulate the current for the Transmit Modulation. The modulation signals for the PV Coupler are generated by going through some electronics 3 uses to sum-up, scale and control the output impedance, which is creating a Current modulation to be applied to Transistor (i.e: MOS FET 10) which is pulling the transmit power from the DC Bus contrarily to traditional PLC line coupler.

As a result, power supply requirement for this communication electronic is only a few milli-watts for both any frequency band plan PLC system.

The U.S. pending patent application Ser. No. 13/227,891 entitled "Powerline Control Interface for Frequency and Amplitude Modulation Transmitter" allows improvements in term of types of modulation to transmit over power wires versus existing PLC technology leveraging similar "Pulling" type of coupling to the power line.

The present invention, while leveraging similar "pulling" type of line coupling, allows performances improvements and cost reduction by using the Transistor (i.e: MOS FET 10) connected directly to the DC Bus.

Existing PLC technology generates transmit signal for "amplitude modulation" only by creating a single transmit Pulse (WO 2006/008381 International Application number) or by creating Multiple transmit Pulses (FR 08 01520 and U.S. Ser. No. 12/185,312) for a single data bit versus the present invention which can support any Standard Modulations (such as ASK, FSK, S-FSK, BPSK, OFDM, etc. . . . ) with frequency bandwidth depending on the chosen standard modulation (Standard Modulations).

Overall system, shown in FIG. 2, is representing the invention in the context of a DC photovoltaic network. The description of the present invention is only related to the transmission part of a PLC system and is comprising of four (4) blocks for transmitting data through the line coupler:
The Boost circuitry block 1
The current sensor block 2
The PWM control block 3
The summation and Command block 4

The Input signal 16 carry Standard Modulation signal (VSignal) by creating enough some voltage to be pulled from the DC Bus powerline. Modulations type such as ASK, FSK, S-FSK, BPSK, OFDM, etc. . . . can be used with the invention.

The following considerations are critical to the invention:

The Input signal 16 is sum-up to the PWM signal (VCmd 15) from the PWM block 3 by the electronics comprise of 26 (Op-Amp) and 22, 23, 24, 25 (resistors). Furthermore the generated signal is used by 30 (Op-Amp in an inverting amplifier mode) to change the output voltage in the opposite direction of the input voltage of 30, to insure that the VcmdGrill signal 12 is in-phase to drive the Command circuit of the Boost Block 1.

Block 3 is a PWM generator uses to create the voltage for the command of Transistor (i.e: MOS FET) 10 (Q1) as part of the MPPT function and its electronics is public knowledge and not relevant to this invention, except that it generates the VCmd signal 15 used by the Summation and Command block 4.

Vref_out signal 28 corresponds to an image of the current absorbed from the grid. The variation of this current is equivalent to the desired impedance modulation. So using the created Vref_out is used by the electronic dedicated to the PWM and one can build a VCmd signal 15, the ON and OFF cycle, used by the Summation block 18.

Modulation thru the transmit block 4 and more specifically through the Transistor (i.e: MOS FET) 10 (Q1) is achieved by sending the data to modulate through the "Input" signal 16 to create the voltage for the command of Transistor (i.e: MOS FET) 10 (Q1).

Block 1 is designed in as a voltage convertor used in a Boost mode (step-up mode). The duty cycle of the Boost Transistor 10 is dependant on the Command signal 15. As a result the Inductor 5 is accumulating energy when the Command signal 15 is ON.

As a result, Transistor 10 periodically "pulled" energy from the powerline in direct relation with the VCmd Grill signal 12 as a result of its adaptation to the Input signal 16 and the Current sensor block 2. The communication power is a direct result of current going through 12.

Block 2 realizes a current sensor function. Resistor 17 presents a very low impedance in order to avoid impacting the effectiveness of the DC Optimizer. The voltage at resistor 17 gives an image of current. A differential amplifier 21 (with resistors, 18 19 20) allows conversion into a voltage proportional to the current. This tension is compare to the desired signal 12 (V cmd grill) The MOS driver 11 commands the Transistor (i.e: MOS FET) 10 allowing current modulation. Transistor (i.e: MOS FET) 10 reacts as an equivalent modulated impedance.

The Low Pass Filter is made of an inductor 5 and a capacitor 7 with a cut-off frequency higher than the frequency used by the Standard Modulation, but lower than the $2^{nd}$ harmonic created by the PLC PV Coupler. As a result only the frequency used by the Input signal will be found on the powerline.

Figure 3:
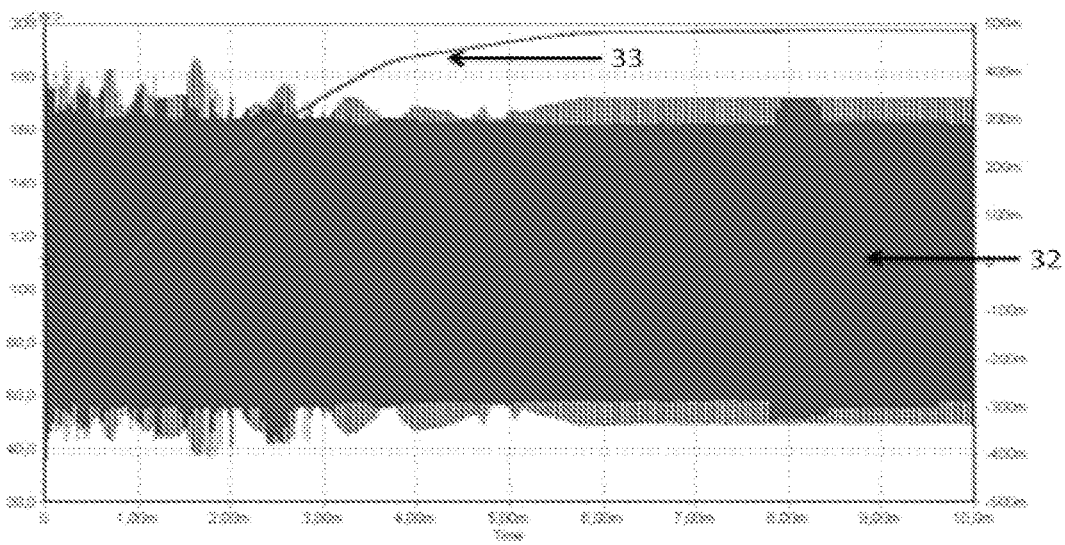
FIG. 3 shows signals of the output voltage of the DC micro-convertor and the transmission chain.
Figure 4:
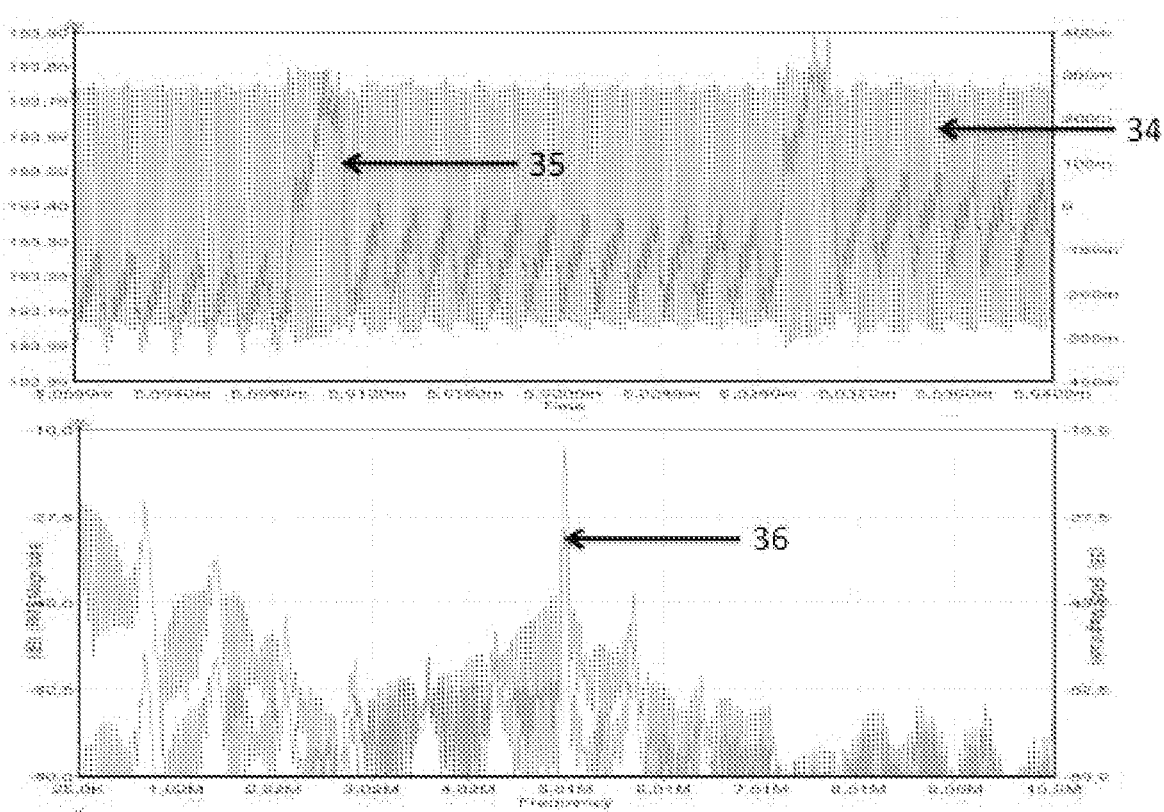
FIG. 4 shows similar signals but with a different timing scale.

FIGS. 3 and 4 show experimental signals of the transmission chain leveraging the present invention. The situation is a DC grid presenting with an output voltage peak in the 200 Volt. The Input signal 16 is a pure tone at 5 MHz and 0.5 Volt peak-to-peak magnitude, as an example of FSK modulation.

FIG. 3 shows how the original signal 16 ("Input signal") is sum-up to the voltage adaptation manage by the MPPT function and resulting in a VOut signal 33, for a period of 10 ms. 32 is the communication signal with a 5 MHz frequency.

FIG. 4 is showing the same signals as FIG. 3 but for a period of 40 μs, 34 is the communication signal (5 MHz) and how the Command signal 15 is used to drive the coupler and creates an Output signal 35. Lower part of FIG. 4 shows the PSD for the VOut signal 36 with the various harmonics.

We claim:

1. A method for impedance modulation wherein said impedance modulation transmits continuous modulated signal for communication purposes in an electrical network comprising:
   A. having a transistor connected to an electrical DC network used for both a DC convertor and a PLC communication;
   B. having a current sensor block to insure optimized performances for said DC convertor;
   C. having an electronic circuit including a linear amplifiers used to sum-up PWM signal and Modulation signal to control a transistor current.

2. The method of claim 1 wherein said linear amplifiers controls said Transistor current.

3. The method of claim 1 wherein a minimum voltage sufficient for power consumption for polarization of the Transistor is applied through said linear amplifiers.

4. The method of claim 3 wherein during transmission phase a voltage, reflecting the sum-up of the PWM and Modulation signals, is created through said linear amplifiers.

5. The method of claim 1 wherein said electrical network further comprises a current sensor circuit for monitoring voltage carried by said network.

6. The method of claim 1 wherein said modulated signal is Standard modulation.

7. The method of claim 1 wherein said network further comprises a processing circuit to receive signals.

8. The method according to claim 1 where is said electrical network is Direct Current.

9. The method according to claim 1 where is applicable to an electronic system managing DC/DC conversion.

10. A apparatus for impedance modulation transmitting continuous modulated signal for communication purposes in an electrical network comprising of: a Transistor connected to said electrical DC network used for both a DC convertor and a PLC communication; a current sensor block to insure optimized performances for the DC convertor; an electronic circuit including a linear amplifiers used to sum-up PWM signal and Modulation signal to control a Transistor current.

11. The apparatus of claim 10 wherein said linear amplifiers controls said Transistor current through a Transistor driver.

12. The apparatus of claim 10 wherein a minimum voltage sufficient for power consumption for polarization of Transistor is applied through said linear amplifiers.

13. The apparatus of claim 12 wherein during transmission phase a voltage, reflecting the sum-up of the PWM and Modulation signals, is created through said linear amplifier.

14. The apparatus of claim 10 wherein said electrical network further comprises a current sensor circuit for monitoring voltage carried by said network.

15. The apparatus of claim 10 wherein said modulated signal is Standard modulation.

16. The apparatus of claim 10 wherein said network further comprises a processing circuit to receive signals.

* * * * *